US 10,862,775 B2

United States Patent
Pfeifer et al.

(10) Patent No.: US 10,862,775 B2
(45) Date of Patent: *Dec. 8, 2020

(54) SUPPORTING PROGRAMMABILITY FOR ARBITRARY EVENTS IN A SOFTWARE DEFINED NETWORKING ENVIRONMENT

(71) Applicant: Cisco Technology, Inc., San Jose, CA (US)

(72) Inventors: Jason Pfeifer, Ed Dorado Hills, CA (US); Richard M. Pruss, Queensland (AU); John E. McDowall, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,158

(22) Filed: Jul. 10, 2019

(65) Prior Publication Data

US 2019/0342192 A1 Nov. 7, 2019

Related U.S. Application Data

(63) Continuation of application No. 13/838,719, filed on Mar. 15, 2013, now Pat. No. 10,397,073.

(51) Int. Cl.
*H04L 12/26* (2006.01)
*H04W 4/50* (2018.01)
*H04W 4/20* (2018.01)

(52) U.S. Cl.
CPC .............. *H04L 43/04* (2013.01); *H04L 43/06* (2013.01); *H04L 43/08* (2013.01); *H04L 43/14* (2013.01); *H04W 4/20* (2013.01); *H04W 4/50* (2018.02)

(58) Field of Classification Search
CPC ......... H04L 43/04; H04L 43/08; H04L 43/06; H04L 43/14; H04W 4/20; H04W 4/50
See application file for complete search history.

(56) References Cited

U.S. PATENT DOCUMENTS

| | | | |
|---|---|---|---|
| 5,481,603 A | 1/1996 | Gutierrez et al. | |
| 5,991,389 A | 11/1999 | Ram et al. | |

(Continued)

FOREIGN PATENT DOCUMENTS

| | | |
|---|---|---|
| CN | 1663217 A | 8/2005 |
| CN | 105284135 A | 1/2016 |
| WO | 14150059 A1 | 9/2014 |

OTHER PUBLICATIONS

International Search Report for PCT/US2014/022055, dated Jun. 6, 2014.

(Continued)

*Primary Examiner* — Patrice L Winder
*Assistant Examiner* — Angela M Widhalm De Rodrig
(74) *Attorney, Agent, or Firm* — Patterson + Sheridan, LLP

(57) ABSTRACT

Techniques are disclosed for using arbitrary criteria to define events occurring within a network infrastructure, as well and techniques for detecting and responding to the occurrence of such custom events. Doing so allows a collection of networking elements (switches, routers, etc.) to perform a variety of distributed functions from within the network itself to respond to custom events. Further, because custom events are published across the network, multiple network elements can communicate and respond to the same event. Thus, unlike currently available event management systems, custom events (and responding applications) can be used to create and coordinate software defined networking within a common network infrastructure.

20 Claims, 6 Drawing Sheets

(56) References Cited

U.S. PATENT DOCUMENTS

| | | | |
|---|---|---|---|
| 6,014,379 A | 1/2000 | White et al. |
| 6,324,547 B1 | 11/2001 | Lennert et al. |
| 6,601,233 B1 | 7/2003 | Underwood |
| 6,640,239 B1 | 10/2003 | Gidwani |
| 6,785,843 B1 | 8/2004 | McRae et al. |
| 6,785,873 B1 | 8/2004 | Tseng |
| 6,983,321 B2 | 1/2006 | Trinon et al. |
| 7,130,807 B1 | 10/2006 | Mikurak |
| 7,467,198 B2 | 12/2008 | Goodman et al. |
| 7,539,744 B2 | 5/2009 | Matthews et al. |
| 7,559,065 B1 | 7/2009 | Sosnovsky et al. |
| 7,656,818 B1 | 2/2010 | Baroudi et al. |
| 7,792,773 B2 | 9/2010 | McCord et al. |
| 7,796,511 B2 | 9/2010 | Wood |
| 7,924,838 B1 | 4/2011 | Bergenwall et al. |
| 7,929,516 B2 | 4/2011 | Darland et al. |
| 8,010,668 B1 | 8/2011 | Rothstein et al. |
| 8,069,047 B2 | 11/2011 | Cross, Jr. et al. |
| 8,150,960 B2 | 4/2012 | Kumbalimutt |
| 8,180,883 B1 | 5/2012 | Clemm et al. |
| 8,185,488 B2 | 5/2012 | Chakravarty et al. |
| 8,352,769 B1 | 1/2013 | Ghose et al. |
| 8,374,986 B2 | 2/2013 | Indeck et al. |
| 8,543,665 B2 | 9/2013 | Ansari et al. |
| 8,612,932 B2 | 12/2013 | Chen et al. |
| 8,745,185 B1 | 6/2014 | Salo |
| 9,178,767 B2 | 11/2015 | Kean et al. |
| 9,231,904 B2 | 1/2016 | Johnson et al. |
| 9,300,593 B2 | 3/2016 | Thakkar et al. |
| 9,325,569 B2 | 4/2016 | Mogul et al. |
| 9,335,750 B2 | 5/2016 | Lu et al. |
| 2002/0174082 A1 | 11/2002 | Miloushev et al. |
| 2003/0028399 A1 | 2/2003 | Davis et al. |
| 2004/0216135 A1 | 10/2004 | Heimbeck |
| 2005/0210457 A1 | 9/2005 | Guilford |
| 2005/0273787 A1 | 12/2005 | Kovachka-Dimitrova et al. |
| 2006/0018253 A1 | 1/2006 | Windisch et al. |
| 2006/0143439 A1 | 6/2006 | Arumugam et al. |
| 2007/0088974 A1 | 4/2007 | Chandwani et al. |
| 2007/0297414 A1 | 12/2007 | Gupta et al. |
| 2008/0086564 A1 | 4/2008 | Putman et al. |
| 2010/0281169 A1 | 11/2010 | Charles |
| 2012/0173715 A1 | 7/2012 | Selitser et al. |
| 2012/0317254 A1 | 12/2012 | Chekhanovskiy et al. |
| 2013/0151690 A1 | 6/2013 | Shah et al. |
| 2013/0191185 A1 | 7/2013 | Galvin |
| 2013/0305357 A1 | 11/2013 | Ayyagari et al. |
| 2013/0322443 A1 | 12/2013 | Dunbar et al. |
| 2014/0280893 A1 | 9/2014 | Pfeifer et al. |
| 2016/0285872 A1 | 9/2016 | Polar et al. |
| 2017/0161609 A1 | 6/2017 | Wood et al. |

OTHER PUBLICATIONS

Chinese Office Action for Application No. 201480015220.X dated Feb. 11, 2018.
Chinese Office Action for Application No. 20140015220.X dated Jul. 31, 2018.

SUPPORTING PROGRAMMABILITY FOR ARBITRARY EVENTS IN A SOFTWARE DEFINED NETWORKING ENVIRONMENT

CROSS-REFERENCE TO RELATED APPLICATIONS

This application is a continuation of co-pending U.S. patent application Ser. No. 13/838,719, filed Mar. 15, 2013, which is herein incorporated by reference in its entirety.

TECHNICAL FIELD

Embodiments of the invention generally relate to techniques for managing computer network infrastructure. More, techniques are disclosed to support programmability for arbitrary events in a software defined networking environment.

BACKGROUND

Networking hardware, Switches and routers, have not traditionally been programmable entities. Instead, network hardware is configured using command line interfaces or external applications and a console connection. Some programming frameworks running on connected hosts or appliances are can also be used to manage network hardware. These approaches put applications managing the network on systems external to the network itself.

While most network management occurs via command line interfaces or configuration tools, some network devices may be configured to respond to specific events that occur on a given network device. For example, embedded event manager (EEM) is a feature included by Cisco's IOS operating system (and some other Cisco operating systems such as IOS-XR, IOS-XE, and NX-OS). EEM allows the behavior of a Cisco network device (e.g., a switch or router) to adapt to some user requirements by supporting a limited set of events and actions performed in response to such events within the network device itself. Using EEM, some problems can be identified and resolved automatically in advance by setting event triggers (called event detectors) to watch for specific types of situations or thresholds, or run a set of actions periodically.

At the same time EEM, and other network management frameworks, does not support the handling of custom or arbitrary events. That is, while EEM can be used to configure a switch or router to respond to a limited set of events, the range of such events is limited to whatever is pre-configured for a given switch. Thus, EEM does not allow network elements to respond to arbitrary user-specified events, custom protocols, or other compound or complex events. Further, the event processing provided by EEM (and other similar technologies) is limited to processing events local to the switch itself.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DESCRIPTION

Overview

Figure 1:
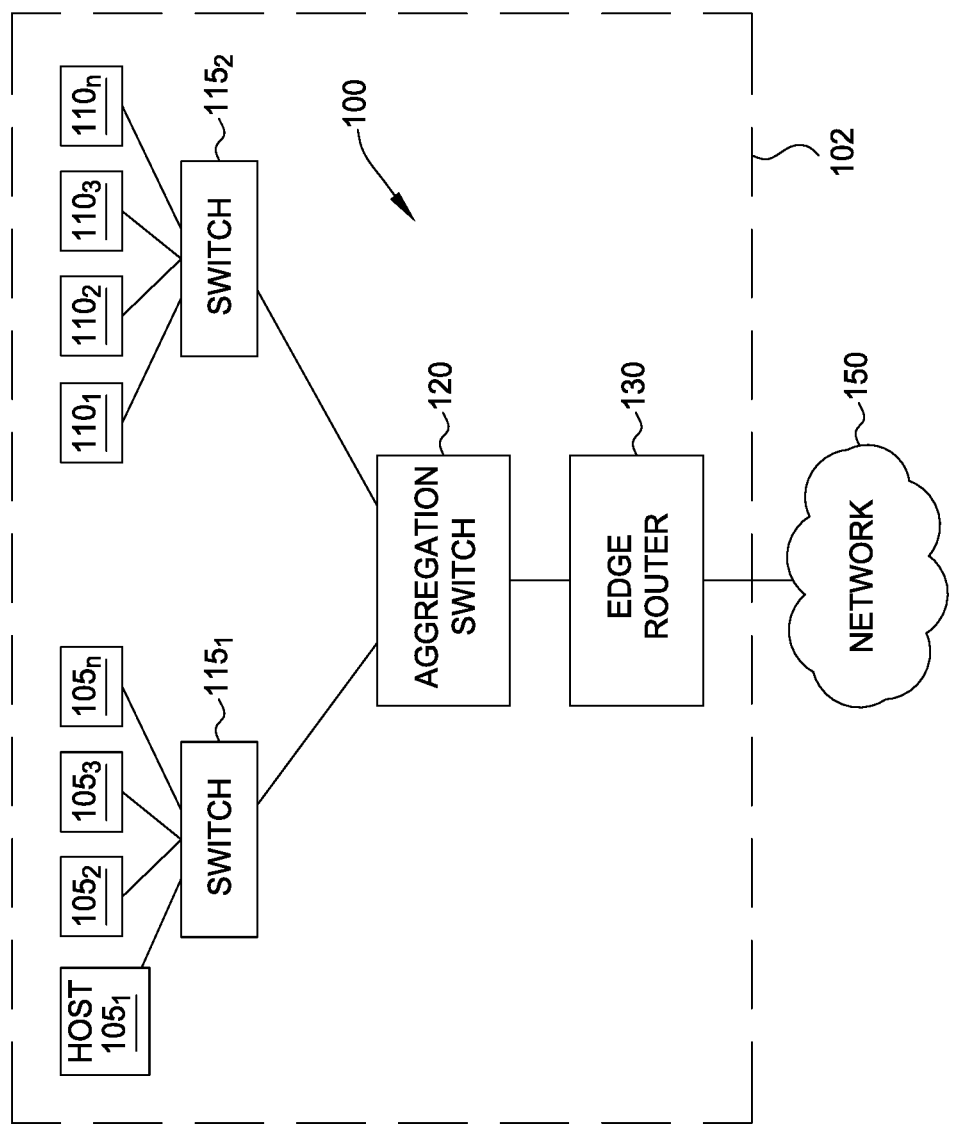
FIG. 1 illustrates an example computer networking infrastructure configured to support software defined networking, according to one embodiment.

Embodiments presented herein include a method for processing network events on a network device in a common network infrastructure. This method may generally include launching, in a container independent from a traffic management component of the network device, an application. This method may also include registering the application to receive notifications of at least a first network even and receiving, by the application, a notification that an instance of the first network event has occurred. The notification indicates an event type and includes metadata associated with the instance of the network event. In response, the application executes one or more functions on the network device from within the container.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

Description of Example Embodiments

Embodiments presented herein provide techniques for supporting programmability for arbitrary events in a software defined networking environment. More specifically, embodiments presented herein allow developers to define custom events monitored for within a network infrastructure. Once defined, an event-matching application may monitor for occurrences of the custom event. The event matching application can run as a process on a switch or router, on a blade in the same chassis as the switch, or in a separate network-connected computing system. The event matching application has programmatic access to read and modify any events already generated by a network device (e.g., embedded event manager (EEM) events on a Cisco switch or router). The event matching application can also access policies, flows, packets, and other information associated with any traffic coming into the network element. More generally, any capability that the switch possesses may be exposed as a possible information source for the event matching application, including functionality such as deep packet inspection, quality of service (QoS), system logs, interface states, forwarding rules, etc.

When a custom event occurs, the event matching application publishes the event to registered subscribers. In turn, any network device or element (including the network element observing the event) which has registered to receive notification that the custom event has occurred can respond by executing custom applications. For example, in response to an interface going down on a switch, a custom event indicating that this has occurred could be published to neighboring switches. In response, an application running on the neighboring switches could update routing information regarding the link state of the interface. Further, in response to the custom event, the switch with the failed interface may invoke applications configured to evaluate whether the link state can be repaired programmatically, and if not send a message to an administrator, all from within the switch itself.

As another example, assume an enterprise wishes to monitor all off-site email communication to identify whether email traffic is being sent out in an unauthorized manner. To do this, the network administrator could create a custom "insecure email" event as 1) an SMTP connection 2) with a receiver outside the organization 3) including an attachment 4) where a portion of the attachment includes the string "confidential" or "secret" in it. When an "insecure email" event occurs, the switch could forward the suspect email to the appropriate administrator.

In one embodiment, applications on the network elements execute in a container. The container may provide an execution space on each network element independent from the routing and switching functions running on that network element. As the above examples illustrate, such applications can modify traffic, settings, or other aspects of the network element itself, but can also generate events processed by other network elements. Doing so allows the collection of networking elements (switches, routers, etc.) to perform a variety of distributed functions from within the network itself in response to custom events, referred to as software defined networking. Further, because custom events are published across the network, multiple network elements can communicate and respond to the same event. Thus, unlike currently available event management systems, custom events (and responding applications) can be used to create and coordinate software defined networking within a network infrastructure.

In the following, reference is made to embodiments of the invention. However, the invention is not limited to any specifically described embodiment. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

As an example, in context of the present invention, a cloud hosting company (hosting a data center with a hosts connected to a network infrastructure) may monitor and charge for certain types of bandwidth. Each tenant of the provider may share the underlying network infrastructure and the provider may use Multi-Protocol Label Switching (MPLS) tags to separate different virtual network flows. In such a case, the event manager could identify tenant flows based on the MPLS tags. The application running on the network elements could then calculate aggregate bandwidth used by each tenant and report it to a logging application running outside of the networking infrastructure.

FIG. 1 illustrates an example computer networking infrastructure 100 configured to support software defined networking, according to one embodiment. The networking infrastructure 100 is included to be a representative view of a variety of networking environments. For example, a collection of server systems and network hardware inside a typical corporate data center (represented here as dashed line 102). As shown, multiple hosts $105_{1-N}$ and $110_{1-N}$ are connected to switches $115_1$ and $115_2$, respectively. Each host 105, 115 generally corresponds to a computing device. For example, hosts 105 and 110 could be a set of blade servers disposed within a chassis. In such a case, each host 105, 110 could be a server blade running an operating system and applications directly. Hosts 105, 110 could also be one of multiple virtual machine instances executing on a server blade.

Illustratively, the computing systems of data center 102 are each attached to a network switch. Switch $115_1$ (for hosts 105) and network switch $115_2$ (for hosts 110). Continuing with the example of a blade server (or other converged infrastructure), switch 115 could be a "top-of-rack switch" connecting the computing devices within the blade server to an aggregation switch 120. Switch $115_{1-2}$ provides a network device with interface ports, a processor, a memory, and forwarding logic used to process network traffic.

Like switch $115_1$ the aggregation switch 120 provides a network device with a memory, processor, and set of network interfaces. In this example, aggregation switch 120 is generally configured to forward data traffic from hosts (via switches $115_{1-2}$) towards a destination (e.g., from one of hosts 105, 110 to another or from one of hosts 105, 110 towards network 150). Aggregation switch 120 is connected to an edge router 130. In turn, edge router 130 connects the systems (switches hosts, etc.) of data center 102 to an external network 150. Like switches 115 and aggregation switch 120, edge router 130 provides a network device configured to process network data flows from other switches, other hosts and other networks. Accordingly, edge router 130 can include a memory, processor, and network interfaces to connect other system within the networking infrastructure 100 to the edge router 130.

In one embodiment, switches 115, 120, or router 130, may include an execution environment (container) used to execute custom applications which respond to events published by the network elements (switches, routers) in the networking infrastructure 100 or published by another network element of network infrastructure 100. Additionally, the switches 115, 120 or router 130 may include an event matching application configured to monitor for, and publish, the occurrence of custom events to the network infrastructure 100. The events, execution container, and event matching component, are each discussed in further detail below.

Note, the computer networking infrastructure 100 is simplified as needed to present an infrastructure which supports programmability for arbitrary events in a software defined networking environment. One of ordinary in the art will recognize that networking infrastructure 100 is representative of a broad variety of network hardware, e.g., switches, routers, bridges, etc., and the computing hosts servers, blades, appliances, virtual machine instances, etc.) as well as converged infrastructure elements (e.g., a blade server chassis with integrated networking elements).

Figure 2:
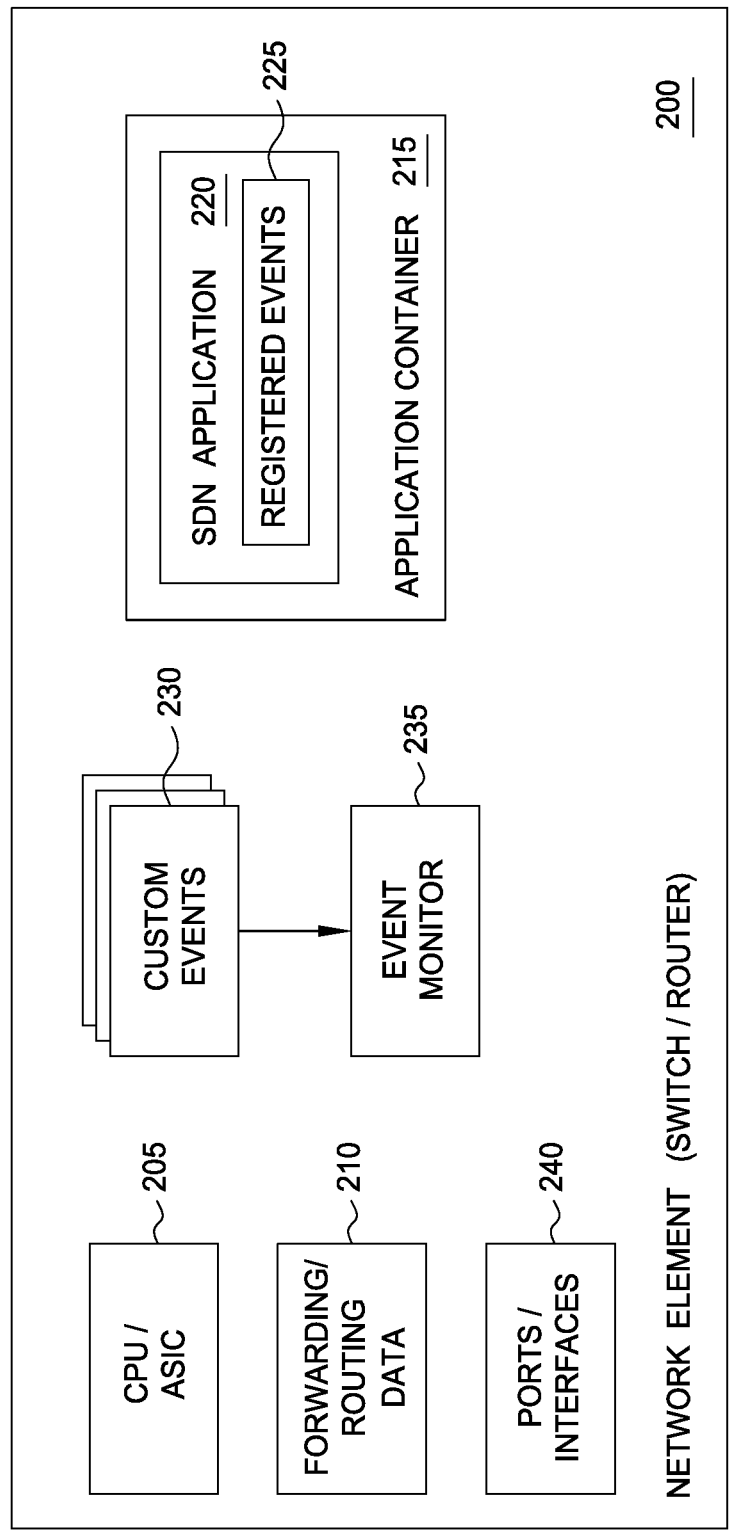
FIG. 2 further illustrates a network element configured to support programmability for arbitrary events in a software defined networking environment, according to one embodiment.

FIG. 2 further illustrates a network element 200 configured to support programmability for arbitrary events in a software defined networking environment, according to one embodiment. Again, network element 200 generally corresponds to a routing, switching, bridge, firewall, appliance, or other network hardware used to process, forward, route, or otherwise provide and manage a computer network.

Illustratively, network element includes a CPU/ASIC (application specific integrated circuit) 205, forwarding/routing data 210, an application container 215, event monitor 235, and custom event definitions 230. The CPU/ASIC 205 provides a processor generally configured to execute instructions to process network packets, frames, flows, etc., received and forwarded over ports/interfaces 240. In general, connected hosts (or other connected devices) forward network frames/packets to network element 200. In turn, the CPU 205 executes forwarding logic to determine how to process any network traffic. Typically, e.g., to make a forwarding decision based on forwarding/routing data 210. Once a decision is made, a network packet/frame received on one interface 240 is forwarded out on another interface 240.

The custom events 230 correspond to any user specified event approaite, as needed for a particular case. For example, events may be related to OIR (Online Insertion and Removal), CLI (Command Line Interface), Syslog, XML-RPC, IP SLAs, NetFlow, application specific events, configuration changes, interface counters, redundancy framework, SNMP notification (i.e. when the device receives a trap), resource usage, Timers, operating system process, counters, diagnostics, environmental (e.g. temperature), routing, object tracking, etc. Note, some events may be provided by the operating system of a network element. For example, a number of these events may be generated by an embedded event manager (EEM) on a network element running a version of Cisco's 10S. In addition to the event itself, a custom event may include data related to an event. For example, an application specific event could be one in which bulk/filtered metric data is sent on a periodic basis containing summary information of other events that have occurred within the related time period. Similarly, a custom event 230 could be composed as a compound of multiple events such, as the interface statistics changing over a certain time period correlated with related interface configuration changes. Further, the custom events 230 could be defined based on an evaluation of network flows, including events corresponding to switch functionality, events triggered using deep packet inspection, events related to quality of service (QoS) or service level agreements (SLA), events triggered by entries in a system log, events triggered by interface states, or the application of a forwarding rule.

However defined, in one embodiment, the event monitor 235 is configured to detect the occurrence of a custom event 230. For example, the event monitor 235 may monitor network activity (e.g., frames received and forwarded over ports/interfaces 240), monitor system state of the network element, counters, or timers, etc., to determine when a custom event 235 has occurred. When the event monitor 235 detects the occurrence of a custom event 235, the event monitor 235 publishes an event received by any network element registered to receive that event. For example, in one embodiment, the network element is broadcast over the control plane of the network infrastructure, allowing each network element to receive the event and raise it to any registered applications. Further, the event monitor 235 may publish the event to other connected devices (e.g., other switches, routers, servers, etc.). In one embodiment, the event may be specified using a two integer identification mechanism, an application identifier and a type. These values are arbitrarily chosen and agreed upon by both the event publisher and subscriber.

Additionally, software defined networking (SDN) applications 225 executing on the network element 200 can register to receive an event, shown in FIG. 2 as registered events 225. For example, an SDN application 225 may register a callback function with the event monitor 235. In such a case, when the event monitor 235 detects an event registered by SDN application 225, the event monitor 235 invokes the callback function of the SDN application 225. In one embodiment, the SDN application 215 executes on the network element within an application container 215. The application container 215 provides an execution environment separate from the routing and forwarding functions of the network element 200. Note, however while the container separates the SDN application 215 from the other routing/forwarding functions of the network element 200, the SDN application 225 can generally access, modify, configure, data in packets, frames, network flows, as well as configure ports/interfaces 240, update, change, modify forwarding/routing data 240, etc. Further, the SDN application 225 can generate custom events 230, communicate with other network elements, applications, or services, as needed to perform a software defined networking function within a common network infrastructure.

Figure 3:
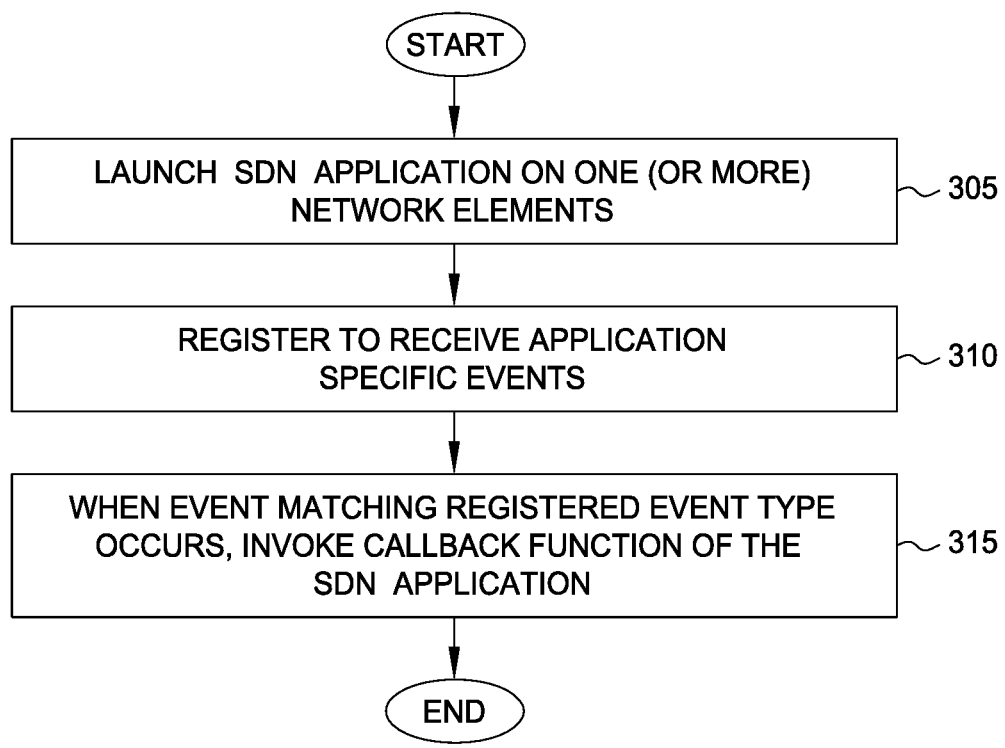
FIG. 3 illustrates a method for a network device to respond to arbitrary events within a software defined networking environment, according to one embodiment.

FIG. 3 illustrates a method 300 for a network device to respond to arbitrary events within a software defined networking environment, according to one embodiment. As shown, the method 300 begins at step 305, where an SDN application is launched on one or more network elements. As noted, the SDN application may be configured to register to receive notifications of custom network events (step 310). For example, the SDN application may register a callback function with an event monitor. In such a case, when the event monitor detects a registered event, it can invoke the callback function (step 315). Alternatively, the SDN application may monitor for events published to a network control plane by that network element or published to the control plane by another network element. Once the SDN application is launched, and registered for any custom events, the SDN application can perform a variety of functions from within the network itself, in response to the occurrence of the registered events.

Figure 4:
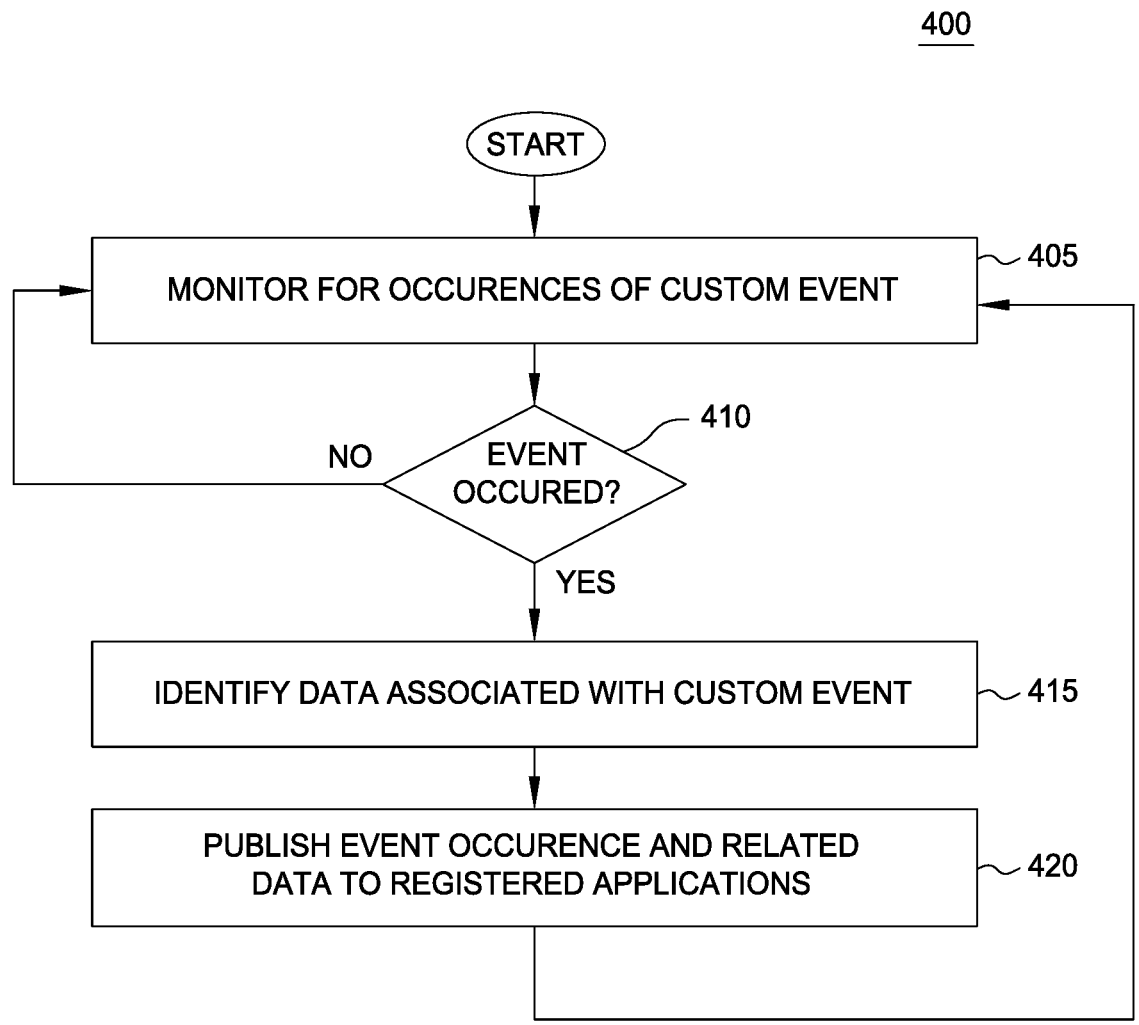
FIG. 4 illustrates a method for a network device to publish arbitrary events within a software defined networking environment, according to one embodiment.

FIG. 4 illustrates a method 400 for a network element to publish arbitrary events within a software defined networking environment, according to one embodiment. As shown, the method 400 begins at step 405, where an event monitor executing on a network element (e.g., switch, router, etc.) monitors for the occurrence of a custom event (step 410). At step 415, once one of the custom events occurs, the event monitor may identify any data associated with the event and publish the event to any registered SDN applications (step 420) or to a control plane for a network infrastructure generally. For example, assume a custom event is used to monitor the link state of interfaces on the network element. Such an event could evaluate system log entries using a regular expression to identify a change in the link state from "UP" to "DOWN." In such a case, the application could identify the particular interface referenced in a system log entry. Further, once the SDN application is notified of the interface state, it can take actions to reroute network flows, repair the link state, or any other programmatic action from within the network itself. Further still, the same custom event can be shared across SDN applications on a group of network elements in a network infrastructure—resulting in multiple elements (and any connected hosts) responding to link state changes (or other custom events) in a consistent and coordinated manner.

As another example, a custom event could identify traffic flow of a particular protocol (e.g., SMTP traffic) using deep packet inspection. An event could pass the contents of such traffic to an SDN application for analysis. Similarly, events could be related to MPLS tags and used to monitor data use for traffic flows for multi-tenant data center. As still another example, a custom event could be triggered by a service running on the network element. The network element could have a service configured to monitor response times (e.g., ICMP responses) from certain hosts and generate custom events when the latency falls below (or exceeds) a given threshold. When an event is published (indicating the threshold has been crossed), the latency data can be passed to an application running in a container on the network element— or to an application running on other network elements.

Figure 5:
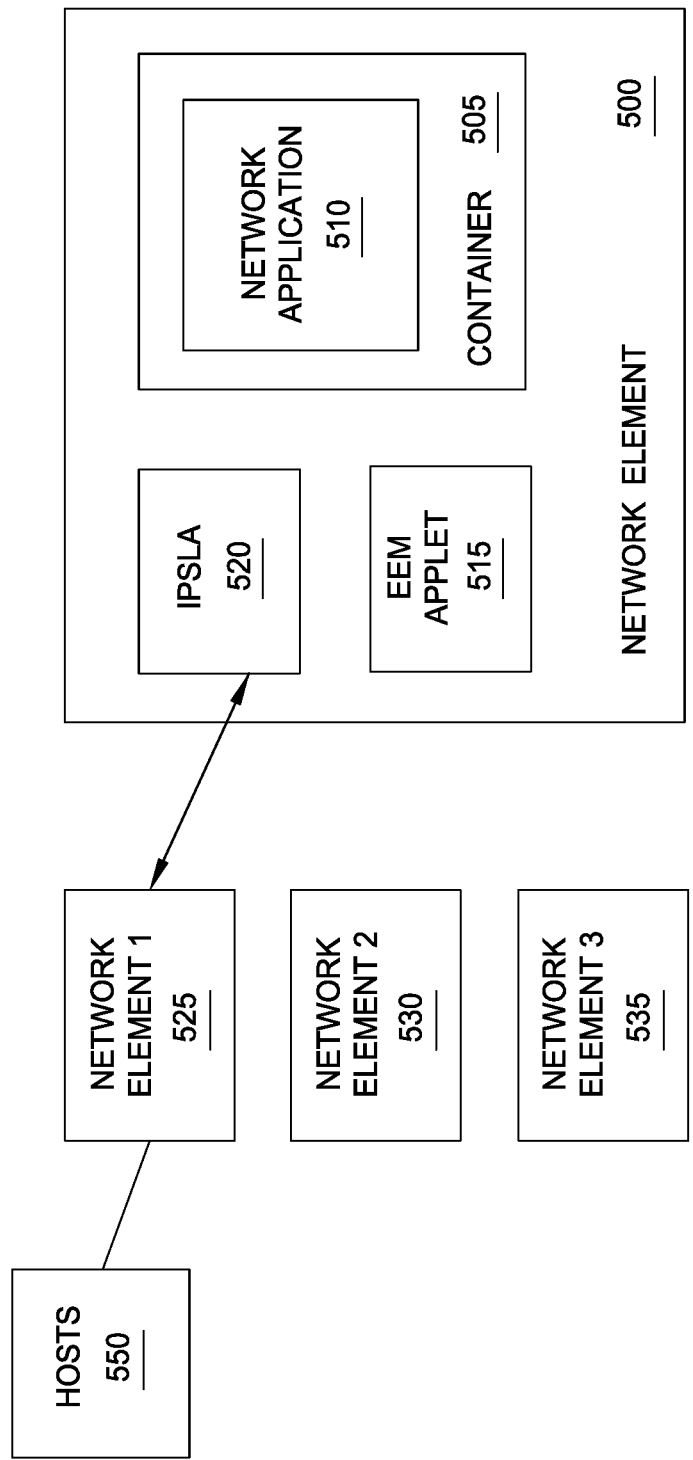
FIG. 5 illustrates multiple network elements configured to respond to user-defined events, within a software defined networking environment, according to one embodiment.

The latter example is further shown in FIG. 5, which illustrates multiple network elements configured to respond to user-defined events, within a software defined networking environment, according to one embodiment. As shown, network elements 500, 525, 530, and 535 provide a set of switches, routers within a common network infrastructure. As such, the network elements 500, 525, 530, and 535 may be connected over a set of interfaces. For example, network element 500 may be an aggregation switch for traffic from switches 525, 530, and 535 (and ultimately, from hosts connected to switches 525, 530, and 535). Assume that network element 450 includes an IPSLA (IP layer service level agreement) component 520 used to monitor the latency of a given host 550. For example, a service provider may have guaranteed a maximum latency for hosts 550. In such a case, the IPSLA component 520 may periodically send ICMP echo requests to network element 525 (or to hosts 550). Further, the IPSLA component 520 may publish IPSLA events, write to a system log, etc. At the same time, the embedded event manager (EEM) applet 515 registers to receive IPSLA events. If the latency passes the threshold specified for an SLA requirement, an event is raised to the EEM applet. In turn, the EEM applet (effectively acting as an event monitor) publishes a custom event with IPSLA event data to network application 510. In response, the network application 510 can execute arbitrary code from within container 505 to, e.g., publish events to SDN applications running on other network elements, reconfigure interfaces on network element 500 or network element 525, notify an administrator, or perform other actions to comply with the provisions of an SLA. Importantly, in this example, the events are published, along with any relevant data, for a SDN application. Further, the custom event can propagate, e.g., as one event shared across the control plane of a network infrastructure or when an SDN application registered to receive the event on one network element publishes an event raised to an SDN application on another SDN application.

Figure 6:
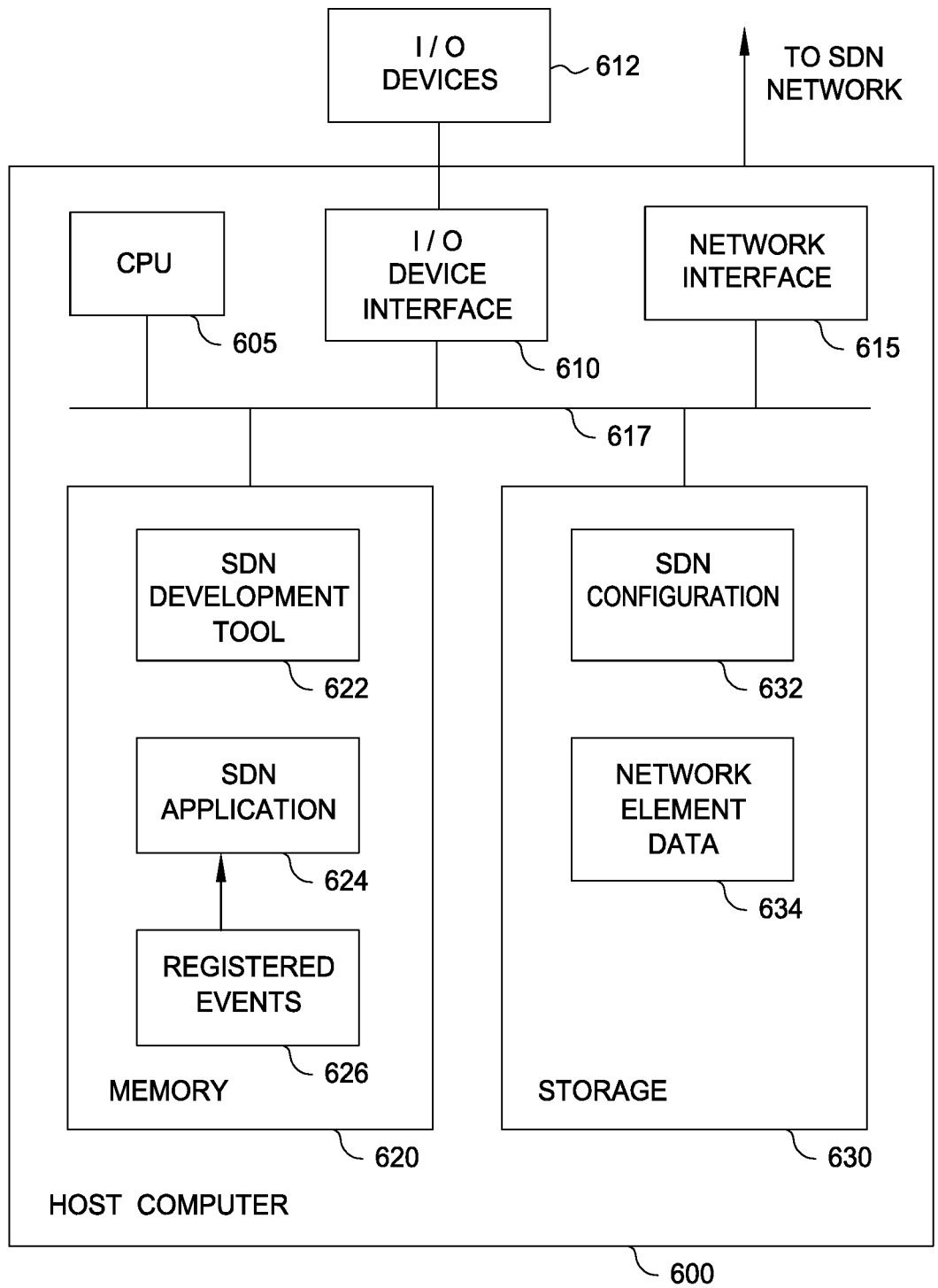
FIG. 6 illustrates an example computing system configured with network management application used to configure a software defined networking environment, according to one embodiment.

FIG. 6 illustrates an example computing system configured with network management application used to configure a software defined networking environment, according to one embodiment. As shown, the computing system 600 includes, without limitation, a central processing unit (CPU) 605, a network interface 615, a network interface 615, a memory 620, and storage 630, each connected to a bus 617. The computing system 600 may also include an I/O device interface 610 connecting I/O devices 512 (e.g., keyboard, display and mouse devices) to the computing system 600. Further, in context of this disclosure, the computing elements shown in computing system 600 is included to be generally representative of both physical computing system (e.g., a system in a data center) as well as virtual computing instances executing within a computing cloud.

The CPU 605 retrieves and executes programming instructions stored in the memory 620 as well as stores and retrieves application data residing in the memory 630. The interconnect 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as fixed disc drives, solid state storage, or optical storage, network attached storage (NAS), or a storage area-network (SAN).

Illustratively, the memory 620 includes an SDN development tool 622, SDN application 624, and registered events 624. And the storage 630 includes SDN configuration data 632 and network element data 634. The SDN development tool 622 provides one or more applications configured to allow developers to compose SDN applications, e.g., SDN application 624. For example, the SDN development tool 622 can include a variety of code editors, compilers, code generators, etc. SDN development tool 622 may also allow a user to configure SDN applications on network elements, define custom events, configure an event detector with the custom events, register SDN applications to receive events, etc. SDN configuration data 632 specifies what SDN applications are configured on what network elements, what custom events they should receive, and the custom event definitions. Similarly network element data 634 can store any information related to a software defined network, e.g., the current configuration of SDN applications within a network infrastructure. Further, as noted the SDN application 624 can execute on a host system connected to a network element (e.g., a server blade attached to a switch in a data center). Once running, the SDN application 624 can register to receive events (shown as registered events 626) published from within the network infrastructure as well as publish events raised to the applications within an SDN network.

As described, embodiments presented herein provide techniques for using arbitrary criteria to define events occurring within a common network infrastructure, as well and techniques for detecting and responding to the occurrence of such custom events. That is, embodiments described above provide techniques that support programmability for arbitrary events in a software defined networking environment. Doing so allows the collection of networking elements (switches, routers, etc.) to perform a variety of distributed functions from within the network itself, referred to as software defined networking. Further, because custom events are published across the network, multiple network elements can communicate and respond to the same event. Thus, unlike currently available event management systems, custom events (and responding applications) can be used to create and coordinate software defined networking within a network infrastructure.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing network events on a network device in a software-defined networking (SDN)-enabled network, the computer-implemented method comprising:
    launching, in a container independent from a traffic management component and an event monitor component of the network device, a first custom SDN application of a user of the network device, wherein the container provides an execution space on the network device, wherein the network device is one of a switch and a router, wherein the traffic management component comprises forwarding logic and a network control plane of a shared network infrastructure;
    identifying a definition of a custom network event that is defined by the user of the network device, wherein the definition specifies one or more functions to execute in the execution space of the container in response to occurrences of the custom network event; and
    propagating the custom network event from the first custom SDN application to a second custom SDN application in an absence of any registered callback function of the second custom SDN application, by publishing the custom network event via the network control plane of the shared network infrastructure to a second network device executing the second custom SDN application.

2. The computer-implemented method of claim 1, wherein the definition further specifies (i) an identifier of the custom network event and (ii) an event type of the custom network event, wherein the custom network event comprises a compound of distinct network events, wherein the computer-implemented method further comprises:
    registering, by the event monitor component, a callback function of the first custom SDN application, whereby the application is notified of occurrences of the custom network event; and
    upon detecting an occurrence of the custom network event by the event monitor component, invoking, by the event monitor component, the registered callback function of the first custom SDN application, whereupon the first custom SDN application is configured to cause execution of the one or more functions specified in the definition of the custom network event, wherein invoking the registered callback function includes transmitting the identifier and event type of the custom network event to the first custom SDN application.

3. The computer-implemented method of claim 2, wherein the network device comprises a first network device, wherein the first network device is one of a switch and a router, wherein the event monitor component of the network device comprises an event monitor component of an operating system executing on the network device, wherein the forwarding logic makes forwarding decisions based on forwarding data, wherein the custom network event comprises a first custom network event;
    wherein the network device comprises an aggregation switch connected to a network via an edge router and further connected to a plurality of hosts via a plurality of network switches, wherein the event monitor is configured to detect each custom network event type selected from:
(i) a first custom network event in which filtered metric data is sent on a periodic basis containing summary information of other events that have occurred within a specified time period; and
(ii) a second custom network event characterized by interface statistics changing over a specified time period correlated with associated interface configuration changes.

4. The computer-implemented method of claim 3, wherein the one or more custom network events are defined based on evaluating network flows and include a respective, custom network event for each network event type selected from:
(i) network events corresponding to switch functionality;
(ii) network events triggered using deep packet inspection;
(iii) network events related to quality of service;
(iv) network events related to service level agreements;
(v) network events triggered by entries in a system log;
(vi) network events triggered by interface states;
(vii) network events triggered by application of a specified forwarding rule;
(viii) network events to monitor changes in one or more link states of one or more interfaces on the network device; and
(ix) network events triggered upon detection of monitored latency of Internet Control Message Protocol (ICMP) responses satisfying a predefined latency threshold.

5. The computer-implemented method of claim 4, wherein the first custom network event is generated in response to, in respective instances:
(i) a service monitoring component executing on the network device determining that a monitored service metric has passed a threshold value; and
(ii) network traffic managed by the traffic management component being processed on the network device;
wherein the one or more custom network events further include a respective, custom network event pertaining to each network aspect selected from: Online Insertion and Removal (OIR), Command Line Interface (CLI), a Syslog protocol, a remote procedure call (RPC) protocol, a NetFlow protocol, application-specific events, configuration changes, interface counters, a redundancy framework, a Simple Network Management Protocol (SNMP) notification, resource usage, timers, operating system processes, counters, diagnostics, temperature, routing, and object tracking;
wherein the one or more custom network events further include an insecure-email event that is defined to trigger upon detection of: a message being sent via a Simple Mail Transfer Protocol (SMTP) connection with a recipient outside of a specified organization, the message including an attachment that includes a string "confidential" or a string "secret".

6. The computer-implemented method of claim 5, wherein the event monitor is configured to publish one or more custom network events to one or more other connected devices of each device type selected from switches, routers, and servers, wherein each custom network event is specifiable via a two-integer identification mechanism that includes an application identifier and an event type;
wherein the first network device further includes an embedded event manager applet, wherein the container is independent from the service monitoring component and the embedded event manager applet;
wherein the service monitoring component is configured to monitoring a latency of a target host and, upon determining that a maximum allowable latency specified in an Internet Protocol (IP) service level agreement for the target host has been exceeded, publish a custom network event specifying that the maximum allowable latency has been exceeded; and
wherein the embedded event manager applet is registered to receive custom network events specifying that the maximum allowable latency has been exceeded, wherein the embedded event manager applet is configured to, upon receiving the custom network event specifying that the maximum allowable latency has been exceeded, propagate the custom network event to the second custom SDN application by publishing the custom network event via the network control plane of the shared network infrastructure, whereupon the second custom SDN application performs a remedial action in order to bring the latency of the target host back into compliance with the IP service level agreement.

7. The computer-implemented method of claim 1, wherein the forwarding logic makes forwarding decisions based on forwarding data.

8. The computer-implemented method of claim 1, wherein the custom network event is generated in response to a service monitoring component executing on the network device determining that a monitored service metric has passed a threshold value.

9. The computer-implemented method of claim 1, wherein the custom network event is generated in response to network traffic managed by the traffic management component being processed on the network device.

10. The computer-implemented method of claim 1, wherein the event monitor component of the network device comprises an event monitor component of an operating system executing on the network device.

11. A computer-readable storage medium storing instructions executable to perform an operation for processing network events on a network device in a software-defined networking (SDN)-enabled network, the operation comprising:
launching, in a container independent from a traffic management component and an event monitor component of the network device, a first custom SDN application of a user of the network device, wherein the container provides an execution space on the network device, wherein the network device is one of a switch and a router, wherein the traffic management component comprises forwarding logic and a network control plane of a shared network infrastructure;
identifying a definition of a custom network event that is defined by the user of the network device, wherein the definition specifies one or more functions to execute in the execution space of the container in response to occurrences of the custom network event; and
propagating the custom network event from the first custom SDN application to a second custom SDN application in an absence of any registered callback function of the second custom SDN application, by publishing the custom network event via the network control plane of the shared network infrastructure to a second network device executing the second custom SDN application.

12. The computer-readable storage medium of claim 11, wherein the forwarding logic makes forwarding decisions based on forwarding data.

13. The computer-readable storage medium of claim 11, wherein the custom network event is generated in response to a service monitoring component executing on the network device determining that a monitored service metric has passed a threshold value.

14. The computer-readable storage medium of claim 11, wherein the custom network event is generated in response to network traffic managed by the traffic management component being processed on the network device.

15. The computer-readable storage medium of claim 11, wherein the event monitor component of the network device comprises an event monitor component of an operating system executing on the network device.

16. A network device on which network events are processed in a software-defined networking (SDN)-enabled network, the network device comprising:
- one or more computer processors;
- a traffic management component comprising forwarding logic and a network control plane of a shared network infrastructure;
- an event monitor component; and
- a memory storing a container, independent from the traffic management component and the event monitor component, the container providing an execution space on the network device for hosting a first custom SDN application of a user of the network device;
- wherein the event monitor component, when executed by the one or more computer processors, performs an operation comprising:
  - identifying a definition for a custom network event that is defined by the user of the network device, wherein the definition specifies one or more functions to execute in the execution space of the container in response to occurrences of the custom network event; and
  - propagating the custom network event from the first custom SDN application to a second custom SDN application in an absence of any registered callback function of the second custom SDN application, by publishing the custom network event via the network control plane of the shared network infrastructure to a second network device executing the second custom SDN application.

17. The network device of claim 16, wherein the forwarding logic makes forwarding decisions based on forwarding data.

18. The network device of claim 16, wherein the custom network event is generated in response to a service monitoring component executing on the network device determining that a monitored service metric has passed a threshold value.

19. The network device of claim 16, wherein the custom network event is generated in response to network traffic managed by the traffic management component being processed on the network device.

20. The network device of claim 16, wherein the event monitor component of the network device comprises an event monitor component of an operating system executing on the network device.

* * * * *

UNITED STATES PATENT AND TRADEMARK OFFICE
CERTIFICATE OF CORRECTION

PATENT NO. : 10,862,775 B2
APPLICATION NO. : 16/508158
DATED : December 8, 2020
INVENTOR(S) : Jason Pfeifer et al.

It is certified that error appears in the above-identified patent and that said Letters Patent is hereby corrected as shown below:

In the Drawings

On sheet 4 of 6, in Figure 4, reference numeral 405, Line 1, delete "OCCURENCES" and insert -- OCCURRENCES --, therefor.

On sheet 4 of 6, in Figure 4, reference numeral 420, Line 1, delete "OCCURENCE" and insert -- OCCURRENCE --, therefor.

In the Specification

In Column 6, Line 31, delete "approaite," and insert -- appropriate, --, therefor.

In Column 6, Line 43, delete "10S." and insert -- IOS. --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*